United States Patent
Lee et al.

(10) Patent No.: US 10,616,386 B2
(45) Date of Patent: Apr. 7, 2020

(54) MOBILE DEVICE WIRELESSLY RECEIVING POWER FROM AN AUXILIARY BATTERY

(71) Applicant: SAMSUNG ELECTRONICS CO., LTD., Suwon-si, Gyeonggi-do (KR)

(72) Inventors: Kyung-Jin Lee, Anyang-si (KR); Il-Jong Song, Suwon-si (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 168 days.

(21) Appl. No.: 15/848,791

(22) Filed: Dec. 20, 2017

(65) Prior Publication Data

US 2018/0219986 A1    Aug. 2, 2018

(30) Foreign Application Priority Data

Jan. 31, 2017   (KR) .................. 10-2017-0014078

(51) Int. Cl.

| | |
|---|---|
| *H01M 10/46* | (2006.01) |
| *H04M 1/02* | (2006.01) |
| *H02J 7/02* | (2016.01) |
| *H02J 7/00* | (2006.01) |
| *H02J 5/00* | (2016.01) |
| *H02J 50/12* | (2016.01) |
| *H04B 5/00* | (2006.01) |
| *H01M 10/44* | (2006.01) |
| *H01M 2/10* | (2006.01) |

(52) U.S. Cl.
CPC ....... *H04M 1/0262* (2013.01); *H01M 2/1055* (2013.01); *H01M 10/441* (2013.01); *H02J 5/005* (2013.01); *H02J 7/0044* (2013.01); *H02J 7/0054* (2013.01); *H02J 7/025* (2013.01); *H02J 50/12* (2016.02); *H04B 5/0037* (2013.01); *H01M 2/1022* (2013.01)

(58) Field of Classification Search
CPC .......... H02J 7/0225; H02J 5/005; H02J 50/15; H02J 50/20; H02J 50/23
USPC .......... 320/103, 108, 114, 116, 117; 307/104
See application file for complete search history.

(56) References Cited

U.S. PATENT DOCUMENTS

| | | | |
|---|---|---|---|
| 8,432,293 B2 | 4/2013 | Symons | |
| 9,059,590 B2 | 6/2015 | Cassidy | |
| 9,385,786 B2 | 7/2016 | Clement et al. | |

(Continued)

FOREIGN PATENT DOCUMENTS

| | | | |
|---|---|---|---|
| KR | 10-2014-0067247 A | 6/2014 | |
| KR | 10-2014-0101795 A | 8/2014 | |

(Continued)

*Primary Examiner* — Edward Tso
(74) *Attorney, Agent, or Firm* — Lee IP Law, P.C.

(57) ABSTRACT

A mobile device includes at least one internal device including a processor to control the mobile device, an area including a main battery, a first antenna to receive power wirelessly transferred from an auxiliary battery of an accessory coupled to the mobile device, and a power manager. The power manager selects the main battery or the auxiliary battery of the accessory as a power source for the at least one internal device, supplies the at least one internal device with power from the main battery when the main battery is selected as the power source, and supplies the at least one internal device with the power received through the first antenna when the auxiliary battery is selected as the power source.

20 Claims, 13 Drawing Sheets

(56) References Cited

U.S. PATENT DOCUMENTS

| | | | |
|---|---|---|---|
| 2012/0271723 A1* | 10/2012 | Penilla | G06Q 20/18 |
| | | | 705/16 |
| 2013/0020875 A1* | 1/2013 | Wozniak | H01M 10/46 |
| | | | 307/72 |
| 2016/0064997 A1 | 3/2016 | Hur et al. | |
| 2016/0190856 A1 | 6/2016 | Baek et al. | |

FOREIGN PATENT DOCUMENTS

| | | |
|---|---|---|
| KR | 10-2014-0124158 A | 10/2014 |
| KR | 10-2014-0135899 A | 11/2014 |
| KR | 10-2016-0025314 A | 3/2016 |
| KR | 10-1608389 B1 | 4/2016 |
| KR | 10-2016-0077934 A | 7/2016 |

\* cited by examiner

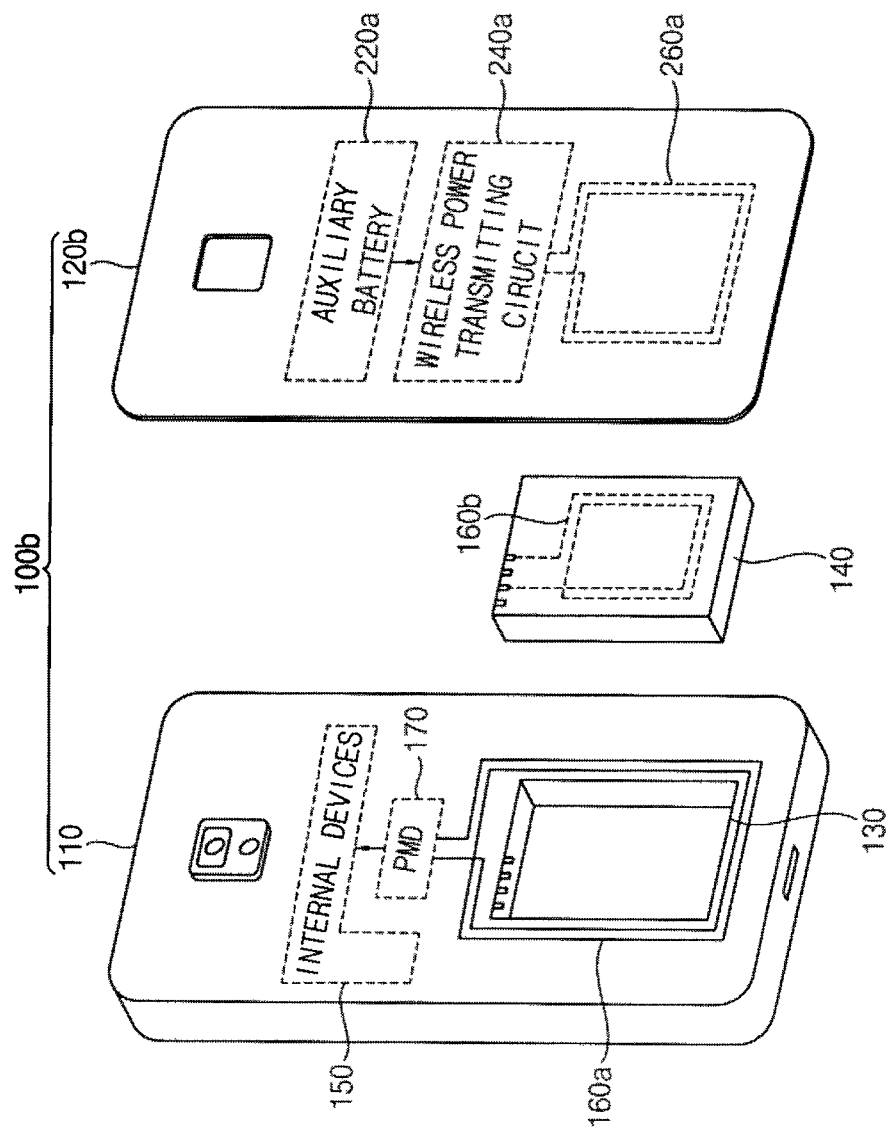

MOBILE DEVICE WIRELESSLY RECEIVING POWER FROM AN AUXILIARY BATTERY

CROSS-REFERENCE TO RELATED APPLICATIONS

Korean Patent Application No. 10-2017-0014078, filed on Jan. 31, 2017, and entitled: "Mobile Device Wirelessly Receiving Power from an Auxiliary Battery," is incorporated by reference herein in its entirety.

BACKGROUND

1. Field

One or more embodiments described herein relate to a mobile device for wirelessly receiving power from one or more auxiliary batteries.

2. Description of the Related Art

Many mobile devices are powered by batteries. Recently, a portable charger having an auxiliary battery has been developed for charging the batteries of mobile devices. The portable charger must be connected to the mobile device through a wired cable. This has proven to be inconvenient for the user.

SUMMARY

In accordance with one or more embodiment, a mobile device includes at least one internal device including a processor to control the mobile device; an area including a main battery; a first antenna to receive power wirelessly transferred from an auxiliary battery of an accessory coupled to the mobile device; and a power manager to select the main battery or the auxiliary battery of the accessory as a power source for the at least one internal device, to supply the at least one internal device with power from the main battery when the main battery is selected as the power source, and to supply the at least one internal device with the power received through the first antenna when the auxiliary battery is selected as the power source.

In accordance with one or more other embodiments, a mobile device includes a main body having an area including a main battery; a cover that covers at least one surface of the main body; at least one internal device in the main body and including a processor; an auxiliary battery inside the cover; a first antenna to receive power wirelessly transferred from the auxiliary battery in the cover; and a power manager to select the main battery or the auxiliary battery of the cover as a power source for the at least one internal device, supply the at least one internal device with power from the main battery when the main battery is selected as the power source, and supply the at least one internal device with the power received through the first antenna when the auxiliary battery of the cover is selected as the power source.

In accordance with one or more other embodiments, a mobile device includes a first connection to a first battery; a second connection to a second battery; and a controller to control the mobile device based on power from the first battery in a first state and to control the mobile device based on power from the second battery in a second state, wherein the second connection is a wireless link to transfer the power from the second battery to control the mobile device and wherein the mobile device is coupled to an accessory including the second battery.

BRIEF DESCRIPTION OF THE DRAWINGS

Features will become apparent to those of skill in the art by describing in detail exemplary embodiments with reference to the attached drawings in which:

FIG. 11 illustrates an embodiment of a mobile device for wirelessly receiving power from an auxiliary battery in a cover of the mobile device.

DETAILED DESCRIPTION

Figure 1A:
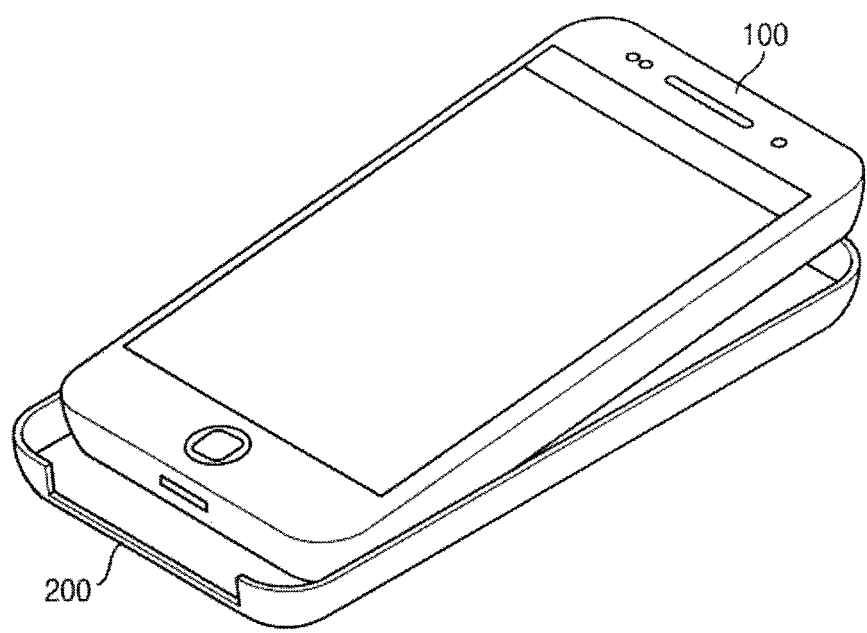
FIGS. 1A and 1B illustrate an example of a mobile device for wirelessly receiving power from an auxiliary battery of an accessory.
Figure 1B:
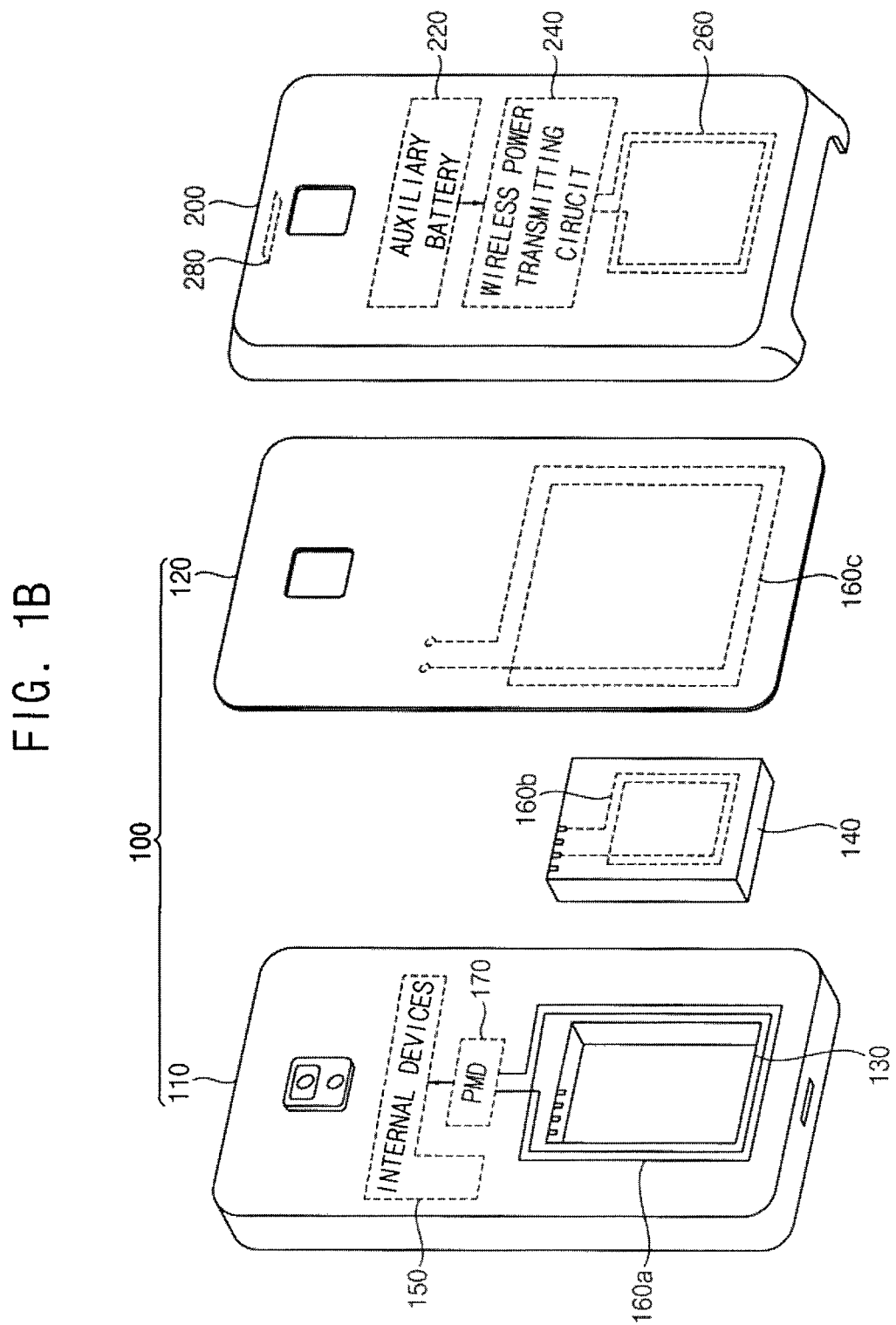
Figure 2:
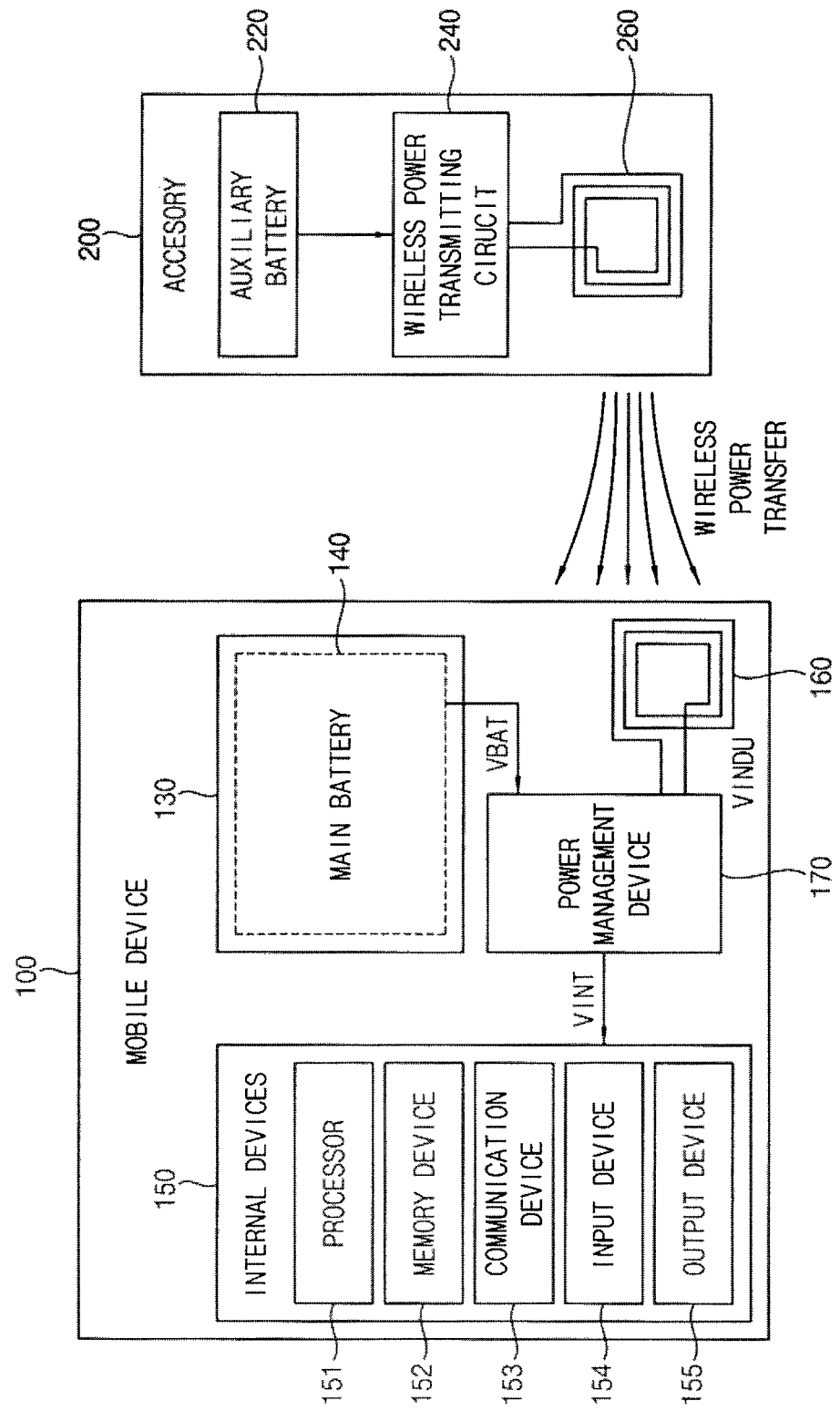
FIG. 2 illustrates an embodiment of a mobile device for wirelessly receiving power from an auxiliary battery of an accessory.

FIGS. 1A and 1B illustrate an embodiment of a mobile device 100 for wirelessly receiving power from an auxiliary battery of an accessory 200. FIG. 2 illustrates a more detailed embodiment of a mobile device for wirelessly receiving power from an auxiliary battery of an accessory.

Referring to FIGS. 1A, 1B, and 2, an accessory 200 including an auxiliary battery 220 may be attached or coupled to a mobile device 100. According to example embodiments, the mobile device 100 may be, for example, a cellular phone, a smart phone, a tablet computer, a laptop computer, a digital multimedia broadcasting (DMB) terminal, a personal digital assistants (PDA) terminal, a portable multimedia player (PMP), a navigation device, a slate computer, an ultrabook, a wearable device, such as a smart watch, a smart glass, a head mounted display (HMD), or another type of electronic device.

In some example embodiments, as illustrated in FIGS. 1A and 1B, the accessory 200 including the auxiliary battery 220 may be a protective case that is attached or coupled to the mobile device 100. The protective case, may cover at least one surface (e.g., rear surface) of the mobile device 100. In other example embodiments, the accessory 200 including the auxiliary battery 220 may be a film attached or adhered to at least a portion of a surface (e.g., rear surface) of mobile device 100. In still other example embodiments, the accessory 200 including the auxiliary battery 220 may be a sticker, a non-slip pad, a smart grip, or any of various types of accessories for improving an appearance of the mobile device 100. According to example embodiments, accessory 200 may be made from leather, urethane, plastic, metal, or another material.

The mobile device 100 may have a housing including a main body 110 and a cover 120 that covers at least one surface (e.g., a rear surface) of the main body 110. The main body 110 may include an area including (or receiving) a main battery 140. For example, the main body 110 may include a battery receiving portion 130 to which the main battery 140 is attached. In some example embodiments, as illustrated in FIG. 1B, the cover 120 may be detachably attached to the main body 110. The main battery 140 also may be detachably attached to the battery receiving portion 130. In other example embodiments, the main body 110 and the cover 120 may be integrally formed as a unitary structure. Thus, the cover 120 may not be separated from the main body 110. In this case, the main battery 140 may be a built-in battery that cannot be separated or detached from the battery receiving portion 130.

The mobile device 100 may include one or more internal devices 150 that operate based on power. In some example embodiments, the internal devices 150 may include a processor 151 that controls operation of the mobile device 100, a memory device 152 that stores data for operation of the mobile device 100, a communication device 153 that performs communication with an external electronic device, an input device 154 that receives an input from a user, and an output device 155 that provides an output to the user. The processor 151 may be, for example, an application processor (AP), a mobile system-on-chip (SOC), a central processing unit (CPU), a microprocessor, etc.

The memory device 152 may include, for example, a nonvolatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc. and/or a volatile memory device, such as a dynamic random access memory (DRAM), a static random access memory (SRAM), a mobile DRAM, etc.

The communication device 153 may include, for example, a long term evolution (LTE) communication device, a wideband code division multiple access (WCDMA) communication device, a global system for mobile communications (GSM) device, a wireless fidelity (WiFi) communication device, a bluetooth communication device, a near field communications (NFC) device, etc.

The input device 154 may be any input device such as a touch screen, a touch pad, a keypad, a keyboard, a mouse, etc. Also, the output device 155 may be any output device, such as a display device, a speaker, a printer, etc.

The accessory 200 may include the auxiliary battery 220, a wireless power transmitter (or a wireless power transmitting circuit 240), and a second antenna (or a wireless power transmitting antenna 260). In some example embodiments, as illustrated in FIG. 1B, the accessory 200 may further include a wired charging cable port 280 to which a wired cable is connected to charge the auxiliary battery 220. For example, the wired charging cable port 280 may be a 5-pin port, a 20-pin port, a 30-pin port, etc. The wireless power transmitting circuit 240 may wirelessly transfer power from the auxiliary battery 220 through the wireless power transmitting antenna 260.

In some example embodiments, the wireless power transmitting circuit 240 may wirelessly transfer the power in a magnetic induction manner. For example, the wireless power transmitting circuit 240 may wirelessly transfer power in accordance with a wireless power consortium (WPC) standard or a power matters alliance (PMA) standard. In other example embodiments, the wireless power transmitting circuit 240 may wirelessly transfer the power in a magnetic resonance manner. For example, the wireless power transmitting circuit 240 may wirelessly transfer the power in accordance with an alliance for wireless power (A4WP) standard.

The mobile device 100 may further include a first antenna (or a wireless power receiving antenna 160) that receives the power wirelessly transferred through the wireless power transmitting circuit 240 and the wireless power transmitting antenna 260 from the auxiliary battery 220. The wireless power receiving antenna 160 may receive a wireless power signal (or the power) transferred from the accessory 200, and may provide the wireless power signal to a power manager (or a power management device 170) of the mobile device 100. For example, power from the auxiliary battery 220 of the accessory 200 may be wirelessly transferred by the wireless power transmitting circuit 240 and the wireless power transmitting antenna 260, a voltage VINDI may be induced at the wireless power receiving antenna 160 by the wirelessly transferred power, and the power management device 170 may receive the voltage VINDI induced at the wireless power receiving antenna 160.

In some example embodiments, as illustrated in FIG. 1B, the wireless power receiving antenna 160 may be formed at the main body 110 of the mobile device 100. For example, the wireless power receiving antenna 160 may be implemented with a coil 160a surrounding the battery receiving portion 130 at the main body 110 of the mobile device 100. In other example embodiments, the wireless power receiving antenna 160 may be formed at the main battery 140. For example, the wireless power receiving antenna 160 may be implemented with a coil 160b on the main battery 140. In still other example embodiments, the wireless power receiving antenna 160 may be formed at the cover 120 of the mobile device 100. For example, the wireless power receiving antenna 160 may be implemented with a coil 160c formed on the cover 120.

The mobile device 100 may further include the power management device 170. The power management device 170 may receive power from the main battery 140, may receive power through the wireless power receiving antenna 160 from the auxiliary battery 220 of the accessory 200, and may supply the internal devices 150 with the power from the main battery 140 or the power received through the wireless power receiving antenna 160. For example, the power management device 170 may selectively convert a battery voltage VBAT from the main battery 140 or the voltage VINDI induced at the wireless power receiving antenna 160 to an internal power supply voltage VINT for supply to the internal devices 150.

The power management device 170 may select the main battery 140 or the auxiliary battery 220 of the accessory 200 as a power source for supplying power to the internal devices 150, and may supply the internal devices 150 with the power from the selected power source. For example, when the main battery 140 is selected as the power source, the power management device 170 may supply the internal devices 150 with power from the main battery 140. In this case, in some example embodiments, the power received through the wireless power receiving antenna 160 from the auxiliary battery 220 of the accessory 200 may be used to charge the main battery 140.

When the auxiliary battery 220 of the accessory 200 is selected as the power source, the power management device 170 may supply the internal devices 150 with power received through the wireless power receiving antenna 160. In this case, the mobile device 100 may operate normally even when the charge amount of the main battery 140 is insufficient or the main battery 140 is separated or detached from the battery receiving portion 130. In some example embodiments, the main battery 140 or the auxiliary battery 220 of the accessory 200 may be selected as the power source based on a selection by a user of the mobile device 100. In other example embodiments, the power management device 170 may detect existence or the charge amount of the main battery 140 and may select the main battery 140 or the auxiliary battery 220 according to the detected existence or charge amount of the main battery 140.

As described above, according to example embodiments, the mobile device 100 may wirelessly receive power from the auxiliary battery 220 in the accessory 200. Accordingly, in order to be supplied with the power from the auxiliary battery 220 of the accessory 200, the mobile device 100 does not have to be connected through a wired cable to the accessory 200. Further, according to example embodiments, the mobile device 100 may select, as the power source, not only the main battery 130 in the battery receiving portion 130 but also the auxiliary battery 220 in the accessory 200. Accordingly, the mobile device 100 according to example embodiments may operated based on the power from the auxiliary battery 220 of the accessory 200, even when the main battery 140 has insufficient charge or the main battery 140 is not in the battery receiving portion 130.

Figure 3:
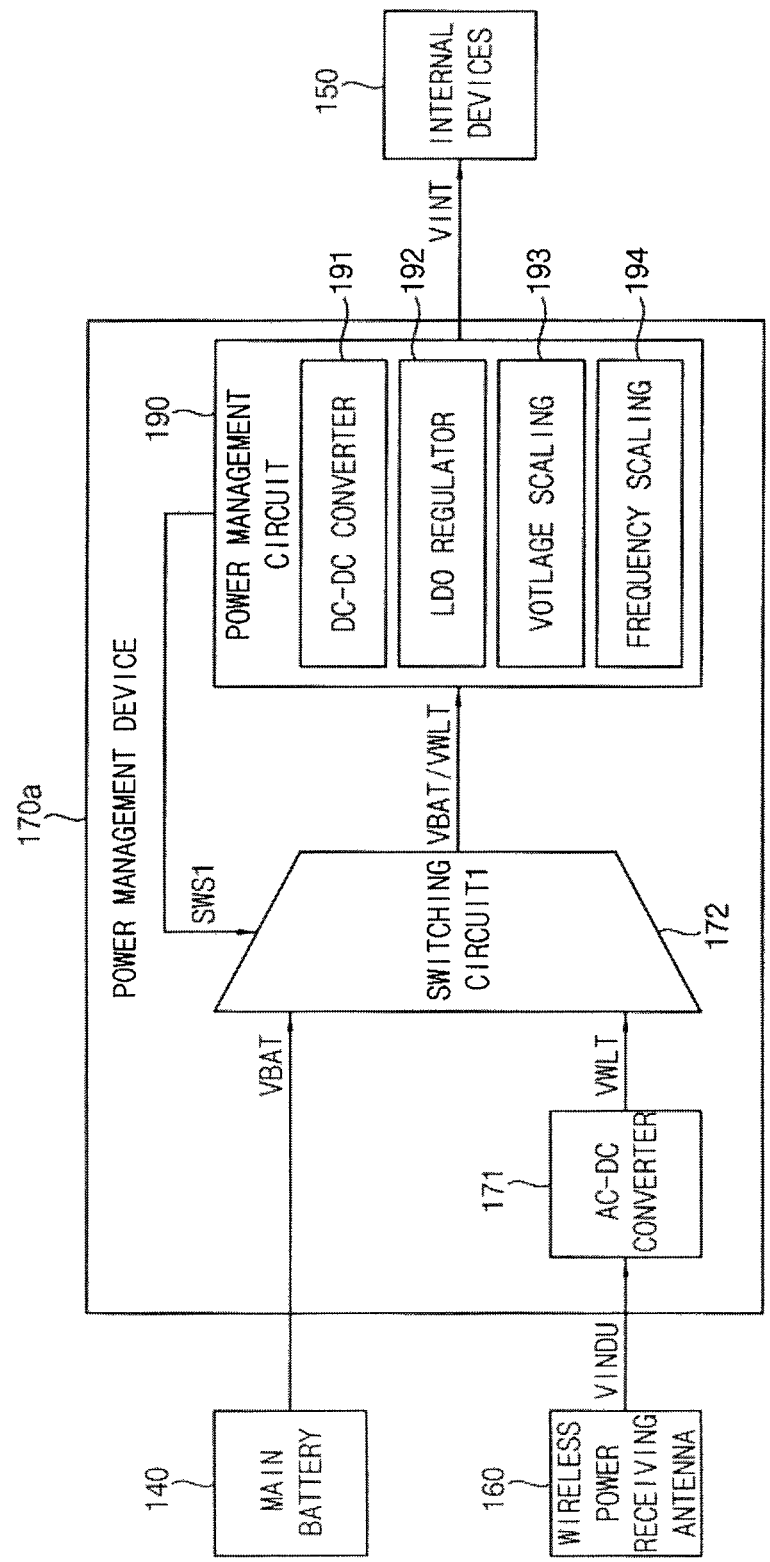
FIG. 3 illustrates an embodiment of a power management device.

FIG. 3 illustrates another embodiment of a power management device 170a in a mobile device, e.g. mobile device 100. Referring to FIG. 3, the power management device 170a may supply internal devices 150 with power from a main battery 140 or power received through a wireless power receiving antenna 160. For example, the power management device 170a may convert a battery voltage VBAT from the main battery 140 or a voltage VINDU induced at the wireless power receiving antenna 160 to an internal power supply voltage VINT, and may supply the internal power supply voltage VINT to the internal devices 150.

The power management device 170a may include an AC-DC converter 171, a first switching circuit 172 and a power manager circuit (or a power management circuit 190). The AC-DC converter 171 may convert the voltage VINDU (e.g., an alternate current (AC) voltage) induced at the wireless power receiving antenna 160 by an auxiliary battery of an accessory attached to or mounted on a mobile device to a wireless transfer power supply voltage VWLT that is a direct current (DC) voltage. In some example embodiments, the AC-DC converter 171 may include a rectifier for converting an AC signal to a DC signal. The AC-DC converter 171 may include, for example, a half-bridge rectifier or a full-bridge rectifier.

The first switching circuit 172 may receive the battery voltage VBAT from the main battery 140, may receive the wireless transfer power supply voltage VWLT from the AC-DC converter 171, and may selectively output the battery voltage VBAT or the wireless transfer power supply voltage VWLT. In some example embodiments, the first switching circuit 172 may receive a first switching signal SWS1 from the power management circuit 190 and may selectively output the battery voltage VBAT or the wireless transfer power supply voltage VWLT based on first switching signal SWS1.

The power management circuit 190 may manage the power for the mobile device. The power management circuit 190 may select the main battery 140 or the auxiliary battery of the accessory as a power source, and may supply the internal devices 150 with power from the selected power source. For example, when the main battery 140 is selected as the power source, the power management circuit 190 may control the first switching circuit 172 to output the battery voltage VBAT, may convert the battery voltage VBAT output from the first switching circuit 172 to the internal power supply voltage VINT suitable for each internal device 150, and may supply the internal power supply voltage VINT to the internal devices 150. In some example embodiments, to control the first switching circuit 172 to output the battery voltage VBAT, the power management circuit 190 may provide the first switching signal SWS1 indicating the battery voltage VBAT to the first switching circuit 172. In some example embodiments, the power management circuit 190 may include a DC-DC converter 191 and/or a low-dropout (LDO) regulator 192 to convert the battery voltage VBAT to the internal power supply voltage VINT. In one embodiment, the DC-DC converter 191 may include a step-up converter for increasing a voltage level and/or a step-down converter for decreasing the voltage level.

The LDO regulator 192 may generate the internal power supply voltage VINT with a small ripple component. In one embodiment, when the auxiliary battery of the accessory is selected as the power source, the power management circuit 190 may control the first switching circuit 172 to output the wireless transfer power supply voltage VWLT, may convert the wireless transfer power supply voltage VWLT output from the first switching circuit 172 to the internal power supply voltage VINT suitable for each internal device 150 using the DC-DC converter 191 and/or the LOD regulator 192, and may supply the internal power supply voltage VINT to the internal devices 150. In some example embodiments, the power management circuit 190 may further include a voltage scaling circuit 193 that controls the DC-DC converter 191 and/or the LOD regulator 192 to dynamically change a voltage level of the internal power supply voltage VINT, and/or a frequency scaling circuit 194 for dynamically changing a frequency of a clock signal provided to the internal devices 150.

As described above, in some example embodiments, the power management device 170a in the mobile device may select one voltage of the battery voltage VBAT provided from the main battery 140 and the voltage VINDU induced at the wireless power receiving antenna 160, may convert the selected one voltage to the internal power supply voltage VINT suitable for the internal devices 150, and may supply the internal power supply voltage VINT to the internal devices 150.

Figure 4:
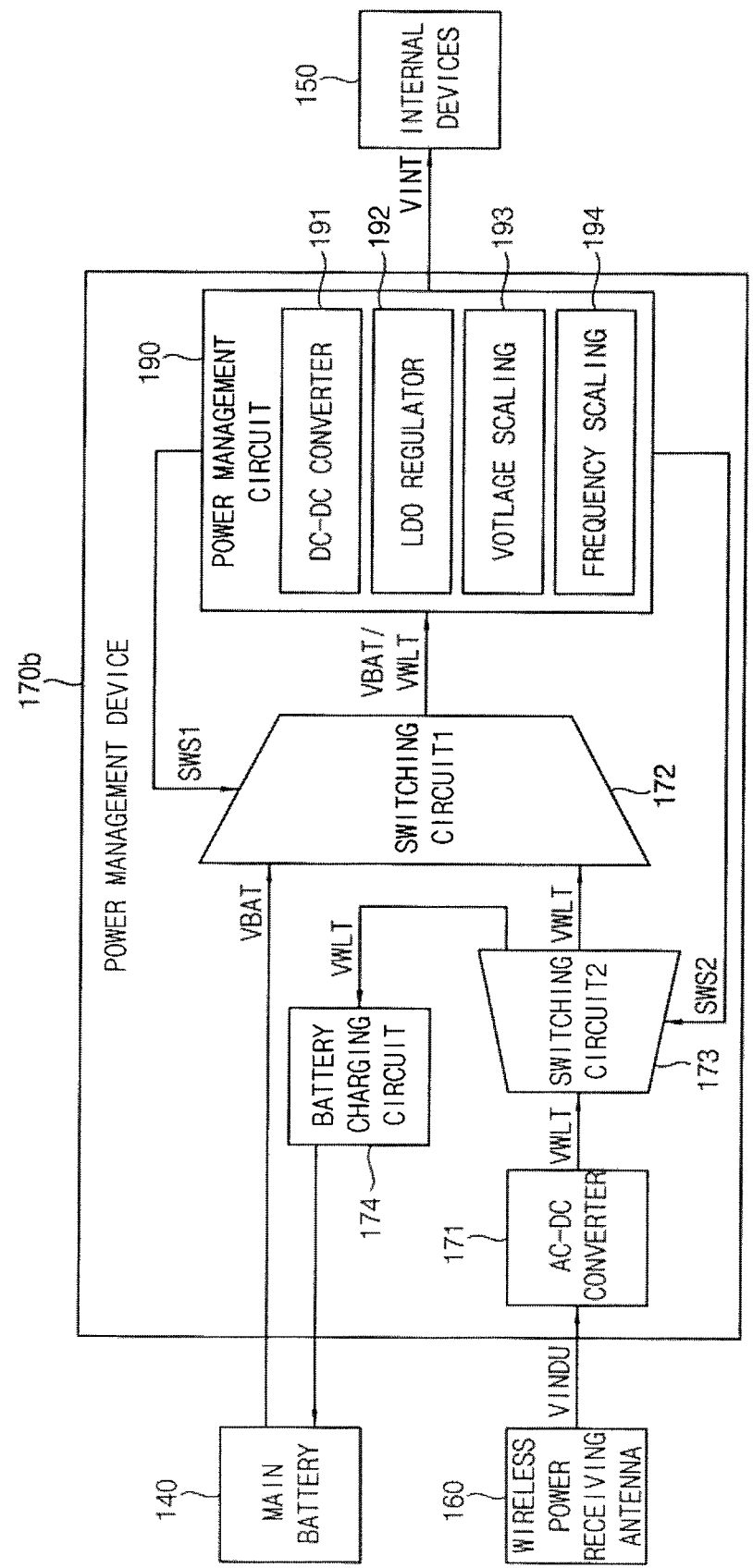
FIG. 4 illustrates another embodiment of a power management device.

FIG. 4 illustrates another embodiment of a power management device 170b in a mobile device, e.g., mobile device 100. Referring to FIG. 4, compared with a power management device 170a in FIG. 3, a power management device 170b may further include a second switching circuit 173 connected to an output of an AC-DC converter 171 and a battery charging circuit 174 for charging a main battery 140.

The second switching circuit 173 may selectively output a wireless transfer power supply voltage VWLT output from the AC-DC converter 171 to a first switching circuit 172 or the battery charging circuit 174. In some example embodiments, the second switching circuit 173 may receive a second switching signal SWS2 from a power management circuit 190, and may selectively output the wireless transfer power supply voltage VWLT to the first switching circuit 172 or the battery charging circuit 174 based on the second switching signal SWS2.

For example, when the main battery 140 is selected as a power source for internal devices 150, the power management circuit 190 may control the second switching circuit 173 to output the wireless transfer power supply voltage VWLT to the battery charging circuit 174, by providing the second switching circuit 173 with the second switching signal SWS2 indicating the battery charging circuit 174. Further, the power management circuit 190 may control the first switching circuit 172 to output a battery voltage VBAT by providing the first switching circuit 172 with a first switching signal SWS1 indicating the battery voltage VBAT. In this case, the battery charging circuit 174 may receive the wireless transfer power supply voltage VWLT through the second switching circuit 173 from the AC-DC converter 171, and may charge the main battery 140 based on the wireless transfer power supply voltage VWLT.

In some example embodiments, the battery charging circuit 174 may further receive a voltage from an external power source connected to a mobile device through a wired cable. Also, it may be possible that the battery charging circuit 174 may charge the main battery 140 based on the voltage received through the wired cable.

As described above, when the main battery 140 is selected as the power source for the internal devices 150, the power management device 170b may generate an internal power supply voltage VINT based the battery voltage VLT from the main battery 140, and may charge the main battery 140 based on a voltage VINDU induced at a wireless power receiving antenna. Accordingly, even when a wired cable is not used to connect the mobile device and an accessory, the mobile device including the power management device 170b may wirelessly receive power from an auxiliary battery of the accessory and may charge the main battery 140 based on the wirelessly received power.

Figure 5A:
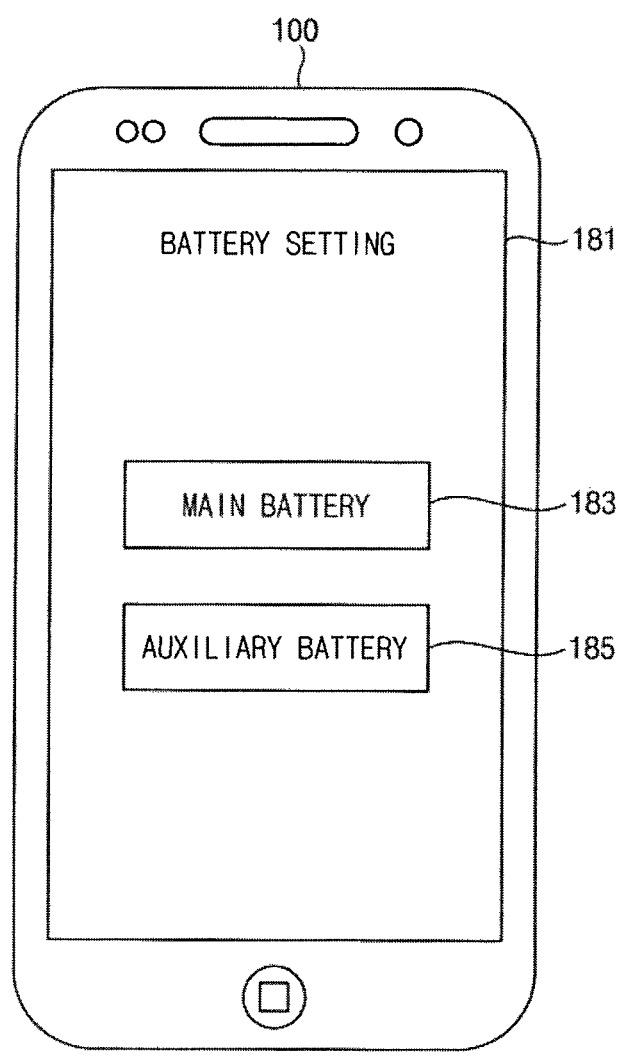
FIG. 5A illustrates an embodiment of how a mobile device selects a power source based on a user selection.
Figure 5B:
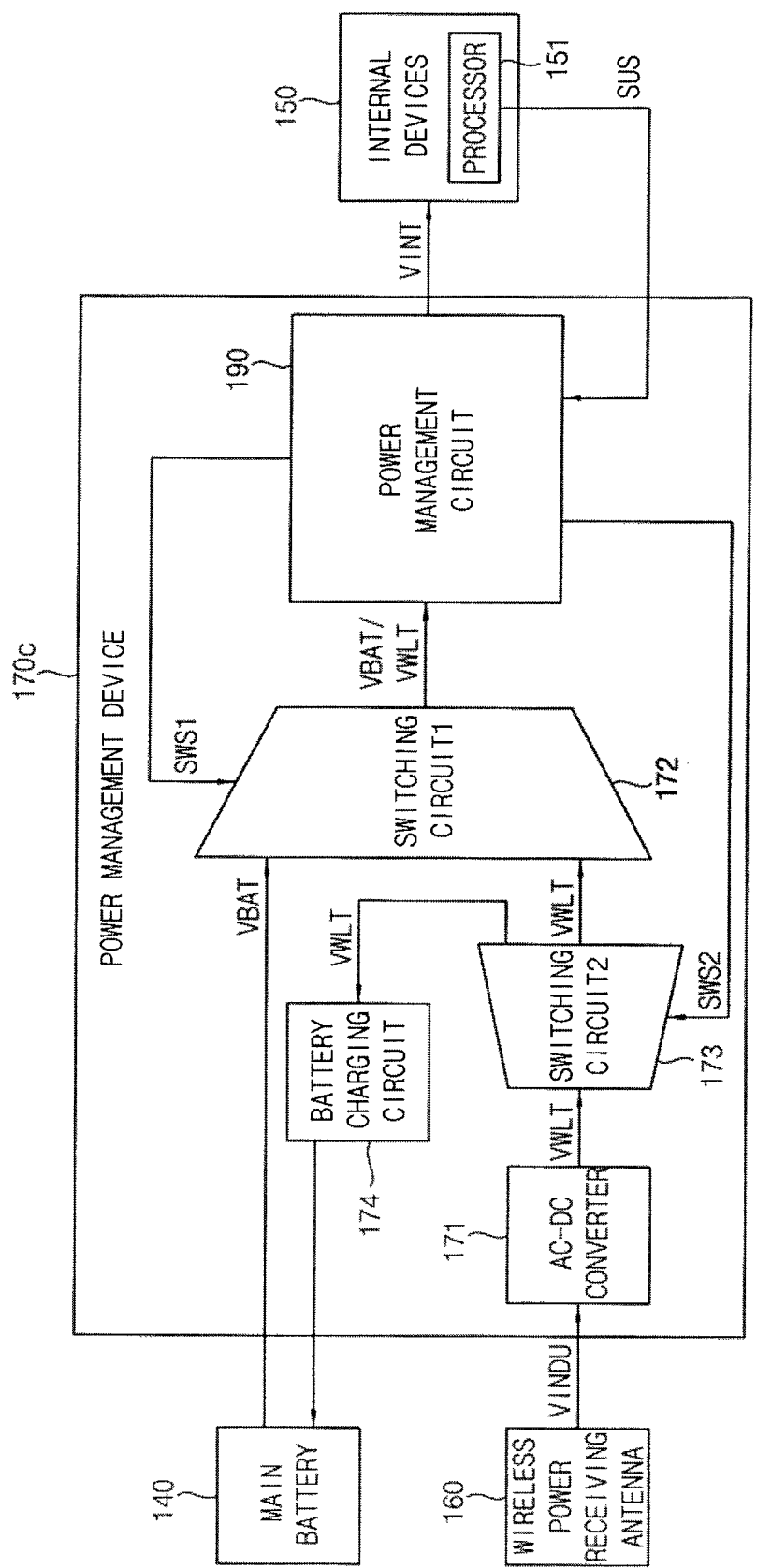
FIG. 5B illustrates an embodiment of a power management device in the mobile device.

FIG. 5A illustrates an embodiment of how mobile device 100 selects a power source according to a user selection. FIG. 5B illustrates another embodiment of a power management device 170c in mobile device 100 that selects a power source according to a user selection.

Referring to FIGS. 5A and 5B, a mobile device 100 may display a battery setting screen 181 to a user of the mobile device 100. The battery setting screen 181 may include a main battery button 183 representing a main battery 140 installed in a mobile device 100 and an auxiliary battery button 185 representing an auxiliary battery in an accessory attached to the mobile device 100. A user of the mobile device 100 may select the main battery 140 as a power source for supplying power to internal devices 150 by pressing the main battery button 183, and may select the auxiliary battery of the accessory as the power source by pressing the auxiliary battery button 185. A processor 151, among the internal devices 150, may generate a user selection signal SUS indicating the main battery 140 or the auxiliary battery of the accessory based on the selection input (e.g. pressing one of the buttons 183 and 185) from the user of the mobile device 100, and may provide the user selection signal SUS to a power management device 170c.

The power management device 170c of FIG. 5 may have a configuration and an operation similar to those of a power management device 170a of FIG. 3 or a power management device 170b of FIG. 4, except that the power management device 170c operates based on the user selection signal SUS generated at the processor 151 by the selection input from the user.

The power management device 170c may select the main battery 140 as the power source based on the user selection signal SUS indicating the main battery 140. For example, a power management circuit 190 may provide a first switching circuit 172 with a first switching signal SWS1 indicating a battery voltage VBAT based on the user selection signal SUS indicating the main battery 140. The power management circuit 190 may provide a second switching circuit 173 with a second switching signal SWS2 indicating a battery charging circuit 174. In this case, the first switching circuit 172 may output the battery voltage VBAT to the power management circuit 190. The power management circuit 190 may convert the battery voltage VBAT to an internal power supply voltage VINT to supply the internal devices 150 with the internal power supply voltage VINT converted from the battery voltage VBAT. Further, the second switching circuit 173 may output a wireless transfer power supply voltage VWLT to the battery charging circuit 174. The battery charging circuit 174 may charge the main battery 140 based on the wireless transfer power supply voltage VWLT.

The power management device 170c may select the auxiliary battery of the accessory as the power source based on the user selection signal SUS indicating the auxiliary battery of the accessory. For example, the power management circuit 190 may provide the first switching circuit 172 with the first switching signal SWS1 indicating the wireless transfer power supply voltage VWLT based on the user selection signal SUS indicating the auxiliary battery of the accessory. The power management circuit 190 may provide the second switching circuit 173 with the second switching signal SWS2 indicating the first switching circuit 172.

The second switching circuit 173 may output the wireless transfer power supply voltage VWLT to the first switching circuit 172. The first switching circuit 172 may output the wireless transfer power supply voltage VWLT to the power management circuit 190. The power management circuit 190 may convert the wireless transfer power supply voltage VWLT to the internal power supply voltage VINT to supply the internal devices 150 with the internal power supply voltage VINT converted from the wireless transfer power supply voltage VWLT.

As described above, the mobile device 100 including the power management device 170c may select the main battery 140 or the auxiliary battery of the accessory as the power source for the internal devices 150 based on the selection input from the user. Although FIG. 5A illustrates an example where the mobile device 100 receives the selection input from the user by displaying the battery setting screen 181 to the user, the mobile device 100 according to example embodiments may receive the selection input from the user in various manners.

Figure 6:
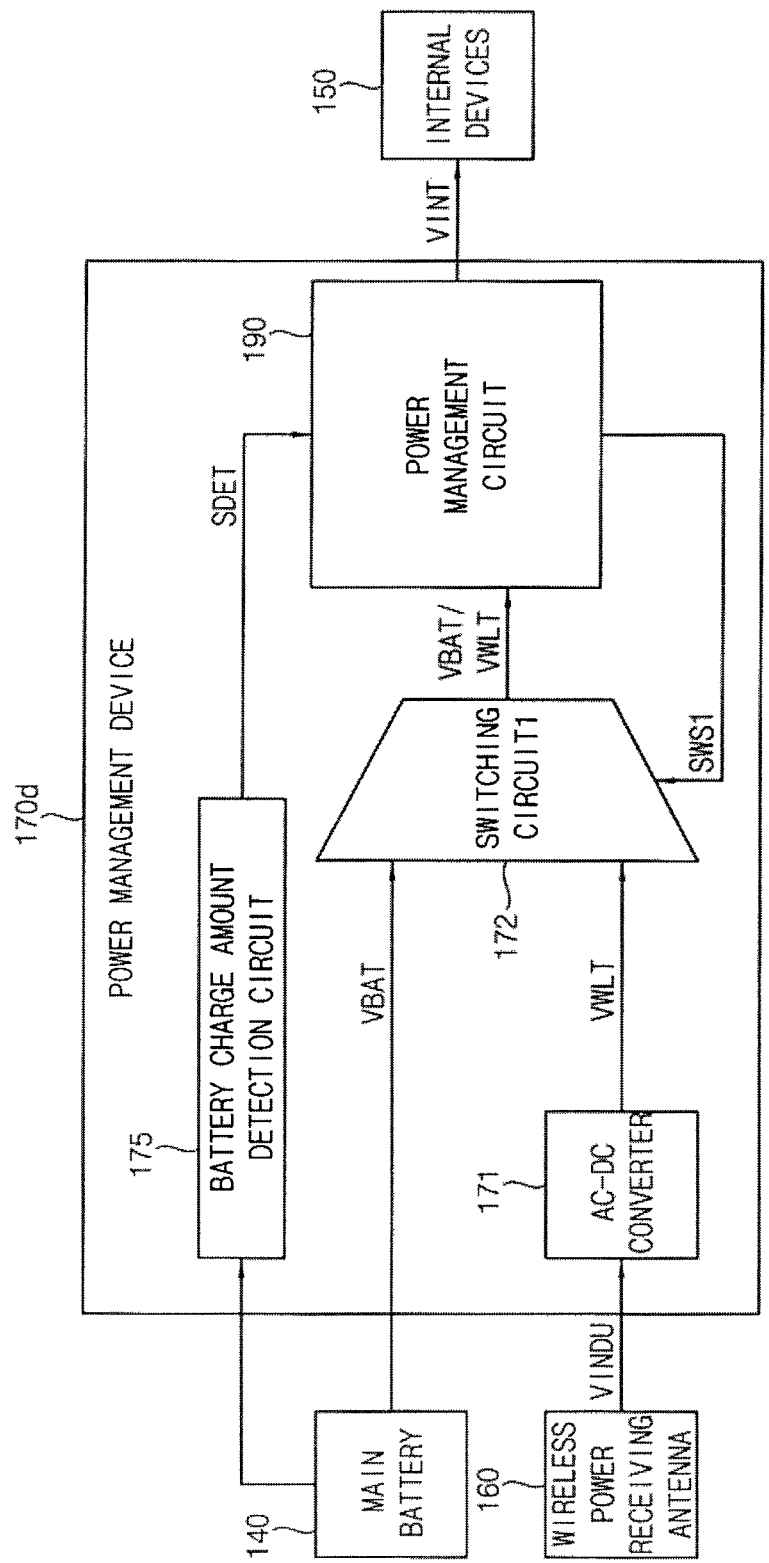
FIG. 6 illustrates another embodiment of a power management device in a mobile device.

FIG. 6 illustrates another embodiment of a power management device 170d in a mobile device that selects a power source according to a charge amount of a main battery. Referring to FIG. 6, compared with power management device 170a of FIG. 3 or power management device 170b of FIG. 4, power management device 170d may further include a detector (or a battery charge amount detection circuit 175) that detects a charge amount of a main battery 140.

The power management device 170d may select the main battery 140 or an auxiliary battery of an accessory as a power source for supplying power to internal devices 150 according to the charge amount of the main battery 140 detected using the battery charge amount detection circuit 175. In some example embodiments, the battery charge amount detection circuit 175 may detect the current (or remaining) charge amount of the main battery 140, and may provide a detection signal SDET indicated the detected charge amount of the main battery 140 to a power management circuit 190. When the charge amount of the main battery 140 indicated by the detection signal SDET is greater than or equal to a reference charge amount, the power management circuit 190 may select the main battery 140 as the power source.

For example, the power management circuit 190 may provide a first switching circuit 172 with a first switching signal SWS1 indicating a battery voltage VBAT, the first switching circuit 172 may output the battery voltage VBAT to the power management circuit 190. The power management circuit 190 may convert the battery voltage VBAT to an internal power supply voltage VINT to supply the internal devices 150 with the internal power supply voltage VINT converted from the battery voltage VBAT.

In one embodiment, when the charge amount of the main battery 140 indicated by the detection signal SDET is less than the reference charge amount, the power management circuit 190 may select the auxiliary battery of the accessory as the power source. For example, the power management circuit 190 may provide the first switching circuit 172 with the first switching signal SWS1 indicating a wireless transfer power supply voltage VWLT, the first switching circuit 172 may output the wireless transfer power supply voltage VWLT to the power management circuit 190. The power management circuit 190 may convert the wireless transfer power supply voltage VWLT to the internal power supply voltage VINT to supply the internal devices 150 with the internal power supply voltage VINT converted from the wireless transfer power supply voltage VWLT.

In other example embodiments, instead of the battery charge amount detection circuit 175, the power management device 170d may include a detector (or a battery existence detection circuit) that detects whether the main battery is in a battery receiving portion. When the main battery 140 is in the battery receiving portion, the power management device 170d may select the main battery 140 as the power source. In one example embodiment, when the main battery 140 is not in the battery receiving portion (e.g., when the main battery 140 is detached or separated from a mobile device), the power management device 170d may select the auxiliary battery of the accessory as the power source. In some example embodiments, the battery charge amount detection circuit 175 may be used as the battery existence detection circuit.

As described above, the mobile device including the power management device 170d may select the main battery 140 or the auxiliary battery of the accessory as the power source for the internal devices 150 according to the existence or the charge amount of the main battery 140.

Figure 7:
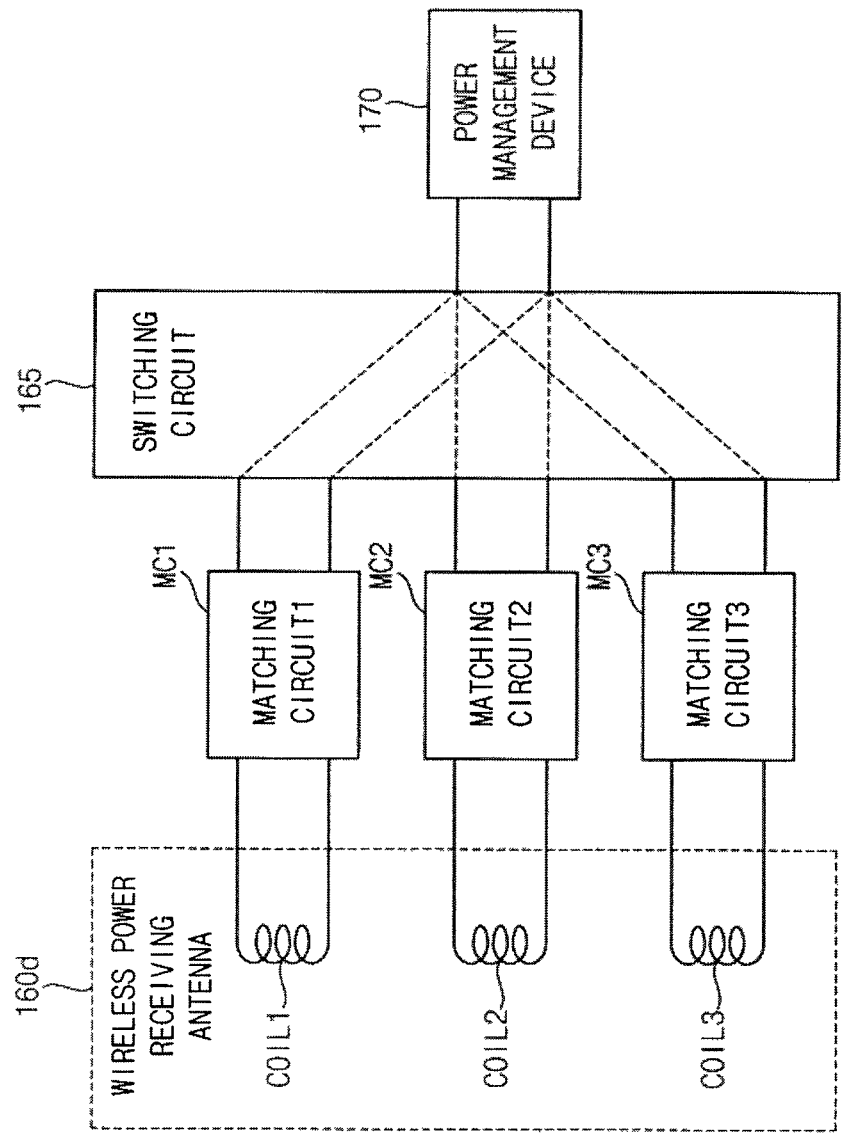
FIG. 7 illustrates an embodiment of a mobile device including one or more coils for receiving power wirelessly transferred from an auxiliary battery.
Figure 8:
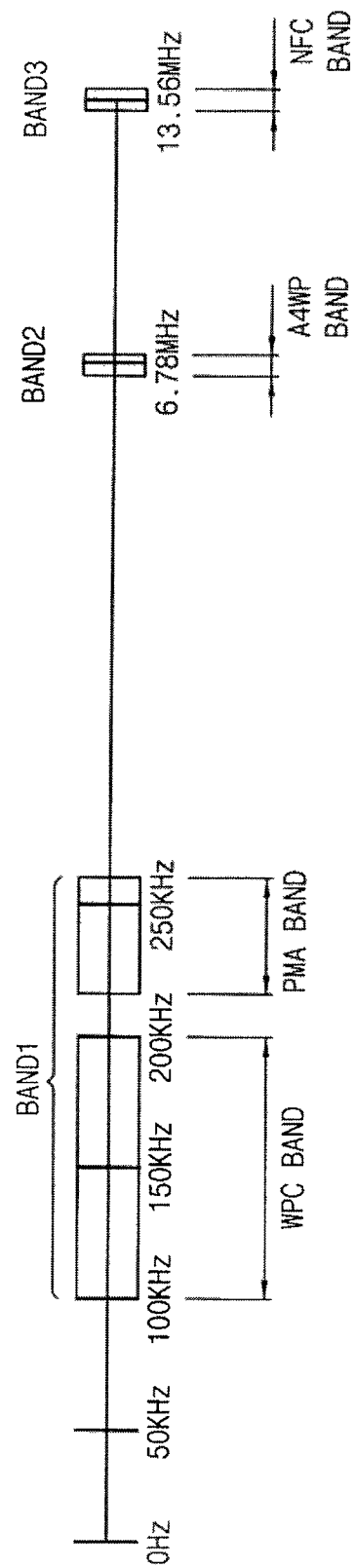
FIG. 8 illustrates an example of frequency bands of a wireless power signal.

FIG. 7 illustrates an embodiment of a portion of a mobile device which includes a plurality of coils for receiving power wirelessly transferred from an auxiliary battery. FIG. 8 illustrates an example of frequency bands of a wireless power signal received through the plurality of coils illustrated in FIG. 7. The mobile device may be any of the embodiments of the mobile device described herein.

Referring to FIG. 7, in some example embodiments, a wireless power receiving antenna 160d for receiving power that is wirelessly transferred from an auxiliary battery of an accessory may include a plurality of coils COIL1, COIL2 and COIL3 for receiving wireless power signals in different frequency bands. In some example embodiments, the coils COIL1, COIL2 and COIL3 may have different numbers of turns, different thicknesses, different lengths, or different shapes to receive the wireless power signals in different frequency bands.

A mobile device receiving the power wirelessly transferred from the auxiliary battery may include a plurality of matching circuits (or wireless power matching circuits) MC1, MC2 and MC3 respectively connected to the coils COIL1, COIL2 and COIL3. Each matching circuit MC1, MC2 and MC3 may include at least one capacitor and/or at least one resistor. Each coil COIL1, COIL2 and COIL3 and the corresponding matching circuit MC1, MC2 and MC3 may be designed to be suitable for the desired frequency band of the corresponding wireless power signal. For example, each coil COIL1, COIL2 and COIL3 and the corresponding matching circuit MC1, MC2 and MC3 may be designed such that an inductance of the coil COIL1, COIL2 and COIL3 and/or a capacitance of at least one capacitor in the matching circuit MC1, MC2 and MC3 may be adjusted to be suitable for the desired frequency band of the corresponding wireless power signal.

In some example embodiments, the wireless power receiving antenna 160d may include a first coil COIL1 for receiving the wireless power signal in a WPC band or a PMA band, a second coil COIL2 for receiving the wireless power signal in an A4WP band, and a third coil COIL3 for receiving the wireless power signal in an NFC band. For example, as illustrated in FIG. 8, the WPC band may be a frequency band from about 110 kHz to about 205 kHz. The PMA band may be a frequency band from about 227 kHz to about 278 kHz. The first coil COIL1 may receive a signal in a first frequency band BAND1 from about 110 kHz to about 278 kHz. The A4WP band may be a frequency band of about 6.78 MHz. The second coil COIL2 may receive a signal in a second frequency band BAND2 of about 6.78 MHz. The NFC band may be a frequency band of about 13.56 MHz. The third coil COIL3 may receive a signal in a third frequency band BAND3 of about 13.56 MHz.

The mobile device may further include a switching circuit 165 that connects one of the matching circuits MC1, MC2, and MC3 to a power management device 170. The power management device 170 may receive the wireless power signal (e.g., a voltage induced at a selected coil COIL1, COIL2, and COIL3) through a selected matching circuit MC1, MC2 and MC3 from the selected coil COIL1, COIL2, and COIL3. The power management device 170 may charge a main battery based on the wireless power signal or may supply power to internal devices based on the wireless power signal.

Although FIG. 7 illustrates an example where the wireless power receiving antenna 160d includes three coils COIL1, COIL2 and COIL3, the wireless power receiving antenna 160d according to example embodiments may include one, two, four or more coils.

Figure 9:
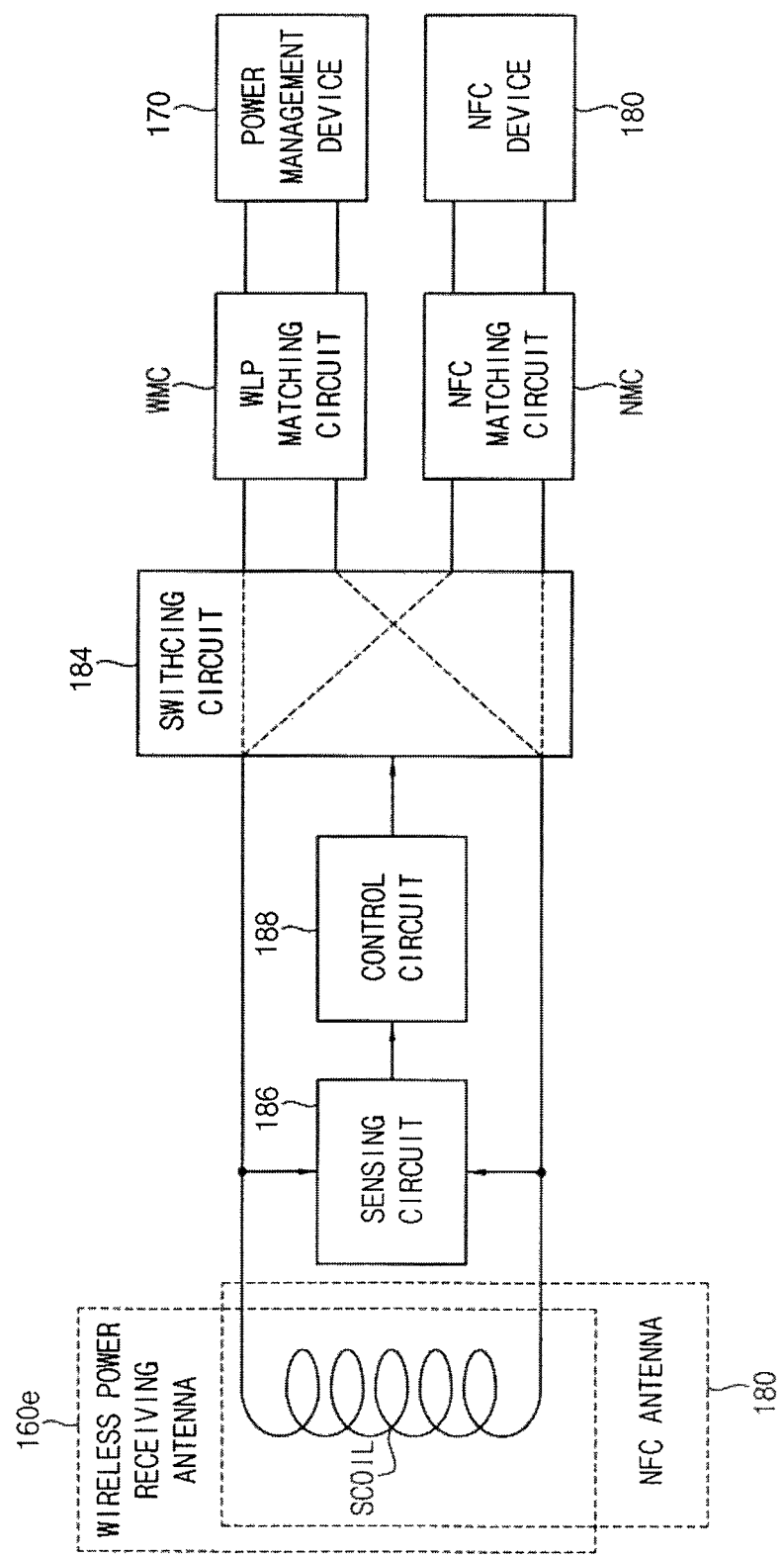
FIG. 9 illustrates an embodiment of a mobile device that uses a common coil to receive a wireless power signal and to transmit/receive an NFC signal.

FIG. 9 illustrating an embodiment of a portion of a mobile device that uses a common coil to receive a wireless power signal and to transmit/receive an NFC signal. The mobile device may be any of the embodiments described herein.

Referring to FIG. 9, a mobile device receiving power wirelessly transferred from an auxiliary battery may include an NFC antenna 180 for transmitting/receiving an NFC signal as well as a wireless power receiving antenna 160e for receiving a wireless power signal transferred from the auxiliary battery. The mobile device may further include an NFC device 182 that transmits/receives the NFC signal through the NFC antenna 180. In some example embodiments, a power management device 170 may use a common coil SCOIL as the wireless power receiving antenna 160e to receive the wireless power signal. The NFC device 182 also may use the common coil SCOIL as the NFC antenna 180 to transmit/receive the NFC signal. Thus, as illustrated in FIG. 9, wireless power receiving antenna 160e and NFC antenna 180 may share common coil SCOIL.

In some example embodiments, the mobile device may further include a wireless power (WLP) matching circuit WMC between the common coil SCOIL and the power management device 170, an NFC matching circuit NMC between the common coil SCOIL and the NFC device 182, and a switching circuit 184 that connects the common coil SCOIL selectively to the WLP matching circuit WMC or the NFC matching circuit NMC. The WLP matching circuit WMC may perform impedance matching between the common coil SCOIL and the power management device 170. The NFC matching circuit NMC may perform impedance matching between the common coil SCOIL and the NFC device 182. The switching circuit 184 may connect the common coil SCOIL to the WLP matching circuit WMC, while the wireless power signal is received through the common coil SCOIL, and may connect the common coil SCOIL to the NFC matching circuit NMC while the NFC signal is received through the common coil SCOIL.

In some example embodiments, the mobile device may control the switching signal 184 according to a signal received at the common coil SCOIL. To perform this operation, the mobile device may further include a sensor (or a sensing circuit 186) that detects a signal level of the signal received at the common coil SCOIL, and a control circuit 188 that controls the switching circuit 184 according to the signal level detected by the sensing circuit 186. The control circuit 188 may determine whether the signal received at the common coil SCOIL is the wireless power signal or the NFC signal according to the signal level detected by the sensing circuit 186.

For example, the sensing circuit 186 may detect, as the signal level, a voltage level, a current level, a power level, and/or a frequency level. The control circuit 188 may determine whether the signal is the wireless power signal or the NFC signal according to the voltage level, the current level, the power level, and/or the frequency level. In an example, the power level (e.g., ranging from several watts to several kilowatts) of the wireless power signal may be higher than the power level (e.g., ranging from several microwatts to several milliwatts) of the NFC signal. Thus, the control circuit 188 may determine that the signal received at the common coil SCOIL is the wireless power signal when the power level detected by the sensing circuit 186 is higher than a reference power level.

In one embodiment, when the power level detected by the sensing circuit 186 is lower than the reference power level, the control circuit 188 may determine that the signal received at the common coil SCOIL is the NFC signal. The control circuit 188 may control the switching circuit 184 to connect the common coil SCOIL to the WLP matching circuit WMC when the signal is determined as the wireless power signal. Control circuit 188 may control switching circuit 184 to connect the common coil SCOIL to the NFC matching circuit NMC when the signal is the NFC signal.

Although FIG. 9 illustrates an example where the wireless power receiving antenna 160e includes only the common coil SCOIL, in some example embodiments, the wireless power receiving antenna 160e may further include one or more other coils.

Figure 10:
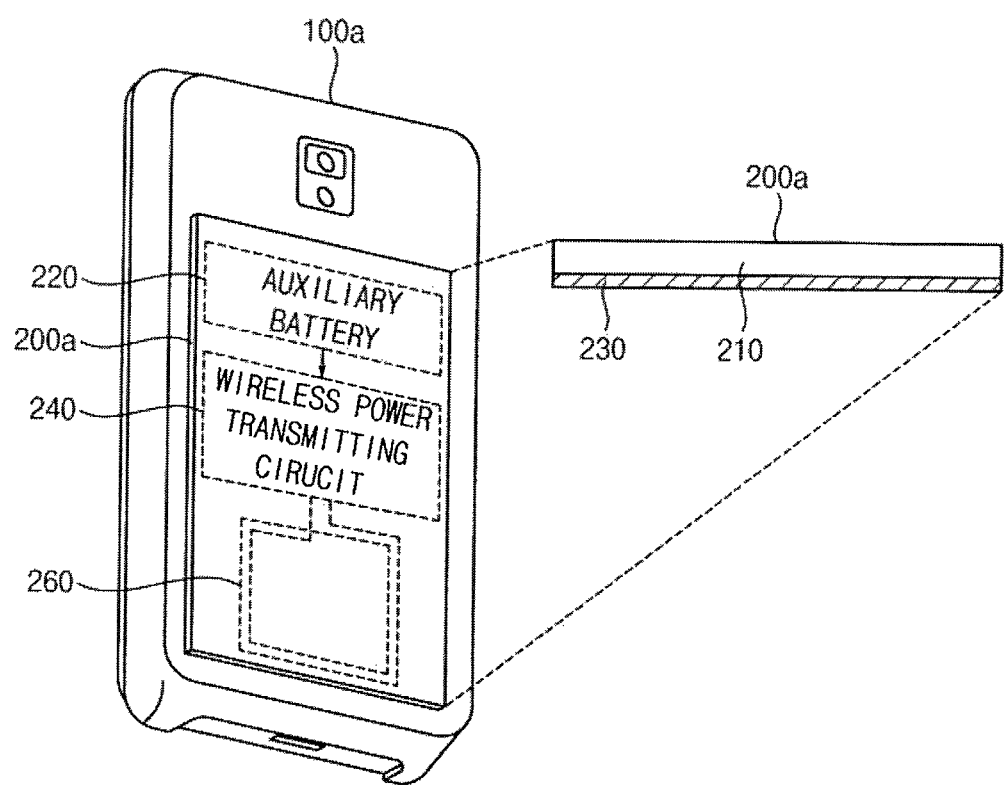
FIG. 10 illustrates an embodiment of a mobile device for wirelessly receiving power from an auxiliary battery of an adhesive film type accessory.

FIG. 10 illustrates another embodiment of a mobile device 100a that wirelessly receives power from an auxiliary battery of an adhesive film-type accessory 200a. Referring to FIG. 10, accessory 200a attached to mobile device 100a may be implemented as a film that may adhere to at least a portion of a surface (e.g., rear surface) of the mobile device 100a. Compared with a mobile device 100 of FIG. 1B to which a protective case-type accessory 100 is attached, the mobile device 100a may have a configuration and an operation similar to the mobile device 100 except that the film type accessory 200a is attached to the mobile device 100a.

The accessory 200a may include a first layer 210 having electronic components (e.g., auxiliary battery 220, a wireless power transmitting circuit 240, and a wireless power transmitting antenna 260) and a second layer 230 that adheres to the surface of the mobile device 100a. For example, the second layer 230 may be an adhesive layer that may be detachably attached to the surface of the mobile device 100a. In some example embodiments, the thickness of the film type accessory 200a may be less than the thickness of the protective case type accessory 100 of FIG. 1B. For example, the film type accessory 200a may have a thickness less than or equal to about 10 mm. Based on power transferred through the wireless power transmitting circuit 240 and the wireless power transmitting antenna 260 from the auxiliary battery 220, the mobile device 100a may charge a main battery or may supply power to internal devices without using the main battery.

FIG. 11 illustrates another embodiment of a mobile device 100b that wirelessly receives power from an auxiliary battery in a cover of the mobile device. Referring to FIG. 11, mobile device 100b may have a housing including a main body 110 and a cover 120b that covers at least one surface (e.g., a rear surface) of the main body 110. The main body 110 may include a battery receiving portion 130 to which a main battery 140 is attached. The cover 120b may include an auxiliary battery 220a, a wireless power transmitting antenna 260a, and a wireless power transmitting circuit 240a that wirelessly transfers power of the auxiliary battery 220a through the wireless power transmitting antenna 260a.

The mobile device 100b may have a configuration and an operation similar to those of a mobile device 100 of FIG. 1B, except that the auxiliary battery 220a, the wireless power transmitting antenna 260a and the wireless power transmitting circuit 240a are formed in the cover 120b. Based on the power transferred through the wireless power transmitting circuit 240a and the wireless power transmitting antenna 260a from the auxiliary battery 220a, the mobile device 100b may charge the main battery 140, or may supply power to internal devices 150 without using the main battery 140.

The embodiments described herein may be applied to any mobile device, including but not limited to as a cellular phone, a smart phone, a tablet computer, a laptop computer, a DMB terminal, a PDA terminal, a PMP, a navigation device, a slate computer, a ultrabook, a wearable device (e.g., a smart watch, a smart glass, a head mounted display (HMD), etc.), or the like.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The managers, processors, devices, switches, converters, regulators, scalers, and other signal generating or signal processing features of the embodiments disclosed herein may be implemented in logic which, for example, may include hardware, software, or both. When implemented at least partially in hardware, the managers, processors, devices, switches, converters, regulators, scalers, and other signal generating or signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the managers, processors, devices, switches, converters, regulators, scalers, and other signal generating or signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

In accordance with another embodiment, a mobile device includes a first connection to a first battery; a second connection to a second battery; and logic to control the mobile device based on power from the first battery in a first state and to control the mobile device based on power from the second battery in a second state, wherein the second connection is a wireless link to transfer the power from the second battery to control the mobile device and wherein the mobile device is coupled to an accessory including the second battery. The first connection may be a wired connection in accordance with any of the aforementioned embodiments, the second connection may be a wireless link in accordance with any of the aforementioned embodiments, and the logic may be any of the processors, management devices, or other signal processing, signal generating, or signal controlling features of the aforementioned embodiments.

The mobile device may also include a screen to display a first selectable area and a second selectable area, wherein the first selectable area is to receive a user input to select the first battery to control the mobile device and the second selectable area is to receive a user input to select the second battery to control the mobile device. These features are illustrated, for example, in FIG. 5A. The power from the second battery controls an operation of the mobile device different from charging the first battery, and the first connection may be a wired connection between the mobile device and the first battery as explained with reference to any of the aforementioned embodiments.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A mobile device, comprising:
   at least one internal device including a processor to control the mobile device;
   an area including a main battery;
   a first antenna to receive power wirelessly transferred from an auxiliary battery of an accessory coupled to the mobile device; and
   a power manager to select the main battery or the auxiliary battery of the accessory as a power source for the at least one internal device, to supply the at least one internal device with power from the main battery when the main battery is selected as the power source, and to supply the at least one internal device with the power received through the first antenna when the auxiliary battery is selected as the power source.

2. The mobile device as claimed in claim 1, wherein the power manager includes:
   an AC-DC converter to convert an AC voltage of the power received wirelessly by the first antenna to a wireless transfer power supply voltage that is a DC voltage;
   a first switching circuit to receive a battery voltage from the main battery, receive the wireless transfer power supply voltage from the AC-DC converter, and selectively output the battery voltage or the wireless transfer power supply voltage; and
   a power manager circuit to control the first switching circuit to output the battery voltage and convert the battery voltage to an internal power supply voltage to supply the at least one internal device with the internal power supply voltage converted from the battery voltage when the main battery is selected as the power source, and to control the first switching circuit to output the wireless transfer power supply voltage and convert the wireless transfer power supply voltage to the internal power supply voltage to supply the at least one internal device with the internal power supply voltage converted from the wireless transfer power supply voltage when the auxiliary battery of the accessory is selected as the power source.

3. The mobile device as claimed in claim 2, wherein:
   the power manager includes a second switching circuit to receive the wireless transfer power supply voltage from the AC-DC converter and output the wireless transfer power supply voltage selectively to the first switching circuit or a battery charging circuit,
   the main battery is to be charged by the battery charging circuit, and
   when the main battery is selected as the power source, the power manager circuit is to control the second switching circuit to output the wireless transfer power supply voltage to the battery charging circuit and the battery charging circuit is to charge the main battery based on the wireless transfer power supply voltage received through the second switching circuit.

4. The mobile device as claimed in claim 1, wherein:
the processor is to generate a user selection signal indicating the main battery or the auxiliary battery of the accessory based on a selection input from a user of the mobile device, and
the power manager is to select the main battery as the power source when the user selection signal indicates the main battery and is to select the auxiliary battery of the accessory as the power source when the user selection signal indicates the auxiliary battery of the accessory.

5. The mobile device as claimed in claim 1, wherein:
the power manager includes a detector to detect a charge amount of the main battery, and
the power manager is to select the main battery as the power source when the charge amount of the main battery is greater than or equal to a reference charge amount and is to select the auxiliary battery of the accessory as the power source when the charge amount of the main battery is less than the reference charge amount.

6. The mobile device as claimed in claim 1, wherein:
the power manager includes a detector to detect whether the main battery is in the area, and
the power manager is to select the main battery as the power source when the main battery is in the area and is to select the auxiliary battery of the accessory as the power source when the main battery is not in the area.

7. The mobile device as claimed in claim 1, wherein the first antenna includes a plurality of coils to receive wireless power signals in different frequency bands.

8. The mobile device as claimed in claim 7, wherein the plurality of coils includes:
a first coil to receive the wireless power signal in a wireless power consortium (WPC) band or a power matters alliance (PMA) band;
a second coil to receive the wireless power signal in an alliance for wireless power (A4WP) band; and
a third coil to receive the wireless power signal in a near field communication (NFC) band.

9. The mobile device as claimed in claim 7, further comprising:
a plurality of matching circuits connected to the plurality of coils, respectively; and
a switching circuit to connect one of the plurality of matching circuits to the power manager.

10. The mobile device as claimed in claim 1, further comprising:
a near field communication (NFC) antenna; and
an NFC device to transmit and receive an NFC signal through the NFC antenna, wherein the first antenna and the NFC antenna share a common coil.

11. The mobile device as claimed in claim 10, further comprising:
a wireless power matching circuit between the common coil and the power manager;
an NFC matching circuit between the common coil and the NFC device; and
a switching circuit to selectively connect the common coil to the wireless power matching circuit or the NFC matching circuit.

12. The mobile device as claimed in claim 11, further comprising:
a sensor to detect a signal level of a signal received at the common coil; and
a control circuit to determine whether the signal received at the common coil is a wireless power signal or the NFC signal based on the signal level detected by the sensor, control the switching circuit to connect the common coil to the wireless power matching circuit when the signal received at the common coil is determined as the wireless power signal, and control the switching circuit to connect the common coil to the NFC matching circuit when the signal received at the common coil is determined as the NFC signal.

13. The mobile device as claimed in claim 1, wherein the accessory includes:
the auxiliary battery;
a second antenna; and
a wireless power transmitter to transfer power from the auxiliary battery to the first antenna through the second antenna.

14. The mobile device as claimed in claim 1, wherein:
the accessory is a protective case attached to the mobile device and covering at least one surface of the mobile device, or a film attached to at least a portion of a surface of mobile device.

15. A mobile device, comprising:
a main body having an area including a main battery;
a cover that covers at least one surface of the main body;
at least one internal device in the main body and including a processor;
an auxiliary battery inside the cover;
a first antenna to receive power wirelessly transferred from the auxiliary battery in the cover; and
a power manager to select the main battery or the auxiliary battery of the cover as a power source for the at least one internal device, supply the at least one internal device with power from the main battery when the main battery is selected as the power source, and supply the at least one internal device with the power received through the first antenna when the auxiliary battery of the cover is selected as the power source.

16. A mobile device, comprising:
a first connection to a first battery;
a second connection to a second battery; and
logic to control the mobile device based on power from the first battery in a first state and to control the mobile device based on power from the second battery in a second state, wherein the second connection is a wireless link to transfer the power from the second battery to control the mobile device and wherein the mobile device is coupled to an accessory including the second battery.

17. The mobile device as claimed in claim 16, further comprising:
a screen to display a first selectable area and a second selectable area,
wherein the first selectable area is to receive a user input to select the first battery to control the mobile device and the second selectable area is to receive a user input to select the second battery to control the mobile device.

18. The mobile device as claimed in claim 16, wherein the power from the second battery controls an operation of the mobile device different from charging the first battery.

19. The mobile device as claimed in claim 16, wherein the first connection is a wired connection between the mobile device and the first battery.

20. The mobile device as claimed in claim 16, wherein the accessory is a protective case or an adhesive film.

* * * * *